US005911518A

United States Patent [19]

Jurek et al.

[11] Patent Number: 5,911,518

[45] Date of Patent: Jun. 15, 1999

[54] SHOWER BATH AND DRAIN

[75] Inventors: Waldemar Robert Jurek, Concord; Artur Puchalski, San Francisco, both of Calif.

[73] Assignee: Eagle Natural Stone, San Francisco, Calif.

[21] Appl. No.: 09/072,271

[22] Filed: May 4, 1998

[51] Int. Cl.[6] .......... A47K 3/22

[52] U.S. Cl. .......... 4/596; 4/613

[58] Field of Search .......... 4/596, 612–614, 4/662

[56] References Cited

U.S. PATENT DOCUMENTS

| | | | |
|---|---|---|---|
| 2,255,893 | 9/1941 | Mullet | 4/613 |
| 3,457,568 | 7/1969 | Amatruda | 4/613 |
| 4,622,911 | 11/1986 | Salminen | 4/612 X |
| 5,718,008 | 2/1998 | Pane | 4/613 |

FOREIGN PATENT DOCUMENTS

| | | | |
|---|---|---|---|
| 2108382 | 5/1983 | United Kingdom | 4/613 |

*Primary Examiner*—Charles E. Phillips

*Attorney, Agent, or Firm*—Townsend and Townsend and Crew LLP

[57] ABSTRACT

A shower bath made of stones includes natural lines of joint between edges of the floor and edges of the wall portions of the shower bath, which are spaced from each other to form gaps along the lines of joint. The gaps are filled with grout except for one gap which is a water discharge gap. The shower floor is substantially planar and inclined downwardly in a direction generally toward the water discharge gap. The discharge gap is bounded at two ends by the grout filling the adjacent gaps so that water falling on the floor can exit through the discharge gap to the drain below the floor. A drain guide has an upper channel portion that cooperates with the edge of the floor and the edge of the wall portion that form the water discharge gap. The drain guide has a lower conduit that provides fluid communication between the upper channel portion and a drain pipe disposed below the shower floor. Water discharged through the discharge gap and collected in the upper channel portion flows through the lower conduit to the drain pipe.

13 Claims, 4 Drawing Sheets

SHOWER BATH AND DRAIN

BACKGROUND OF THE INVENTION

A large number of shower baths are installed every year. A typical shower employs a floor drain that is located near the middle of the shower floor which is inclined downwardly toward the drain. For floors made of stones such as marble or granite, the stones must include additional diagonal cuts to create the slopes of incline toward the drain, requiring additional labor time and resulting in an aesthetically unpleasing look. The required cuts also limit the patterns that can be created by setting the stones. The additional cuts also trap dirt and mildew. Moreover, a metallic drain cover is placed over the drain and serves as a strainer. Strong acidic cleaning agents used to clean the stones react with the metal in the drain cover discolor the metallic drain cover, further worsening the appearance of the shower floor. For many years, these problems which are unique to stone shower baths have persisted without a satisfactory solution. Because stones are selected for their aesthetic appeal, the problems of appearance are of great significance.

SUMMARY OF THE INVENTION

The present invention is directed to a shower bath that avoids the problems and disadvantages of the prior art. This goal is accomplished by providing a shower bath that has a water discharge gap formed at a natural line of joint between a side edge of the shower floor and a bottom edge of a shower wall. The discharge gap directs the water to a drain disposed underneath the shower floor. The drain is invisible and no drain cover is needed. The floor does not require any undesirable cuts. The floor can simply be inclined in one direction. The water flows by gravity to the invisible drain via the water discharge gap. The discharge gap is typically so small that it is not visible by a person in a standing position.

In accordance with an aspect of the invention, a shower bath comprises a floor having a plurality of edge portions which include a discharge edge portion and filled edge portions. The floor is substantially planar and inclined downwardly in a direction generally toward the discharge edge portion. A drain is disposed below the floor adjacent the discharge edge portion. A plurality of wall portions are disposed above the floor and include a discharge wall portion and filled wall portions. The discharge wall portion has a lower edge which is adjacent to and spaced directly above the discharge edge portion to form a discharge gap along a line of joint. The filled wall portions each have a lower edge adjacent to and spaced above one of the plurality of filled edge portions of the floor along a line of joint to form a filled gap which is filled with grout. The discharge gap is bounded at two ends by the grout of adjacent filled gaps, so that the water falling on the floor can exit through the discharge gap to the drain below the floor.

The drain includes a drain guide connected between the discharge gap and a drain pipe to guide the water to the drain pipe. The drain guide is made of a water-impermeable material such as plumbing plastic. The drain guide can take on various suitable shapes. In one embodiment, the shower drain for guiding water from the discharge gap comprises an upper channel portion and a lower conduit portion. The upper channel portion has a rear channel wall for cooperating with the lower edge of the shower wall, and a front channel wall horizontally spaced from the rear channel wall for cooperating with the side edge of the shower floor. The upper channel portion further includes a channel bottom connecting the rear channel wall with the front channel wall. The channel bottom has a drain opening. A lower conduit portion extends downwardly from the drain opening of the channel bottom, so that water collected in the upper channel portion can flow through the lower conduit portion to the drain pipe. In a preferred embodiment, the rear channel wall and front channel wall are deformable to accommodate different spacing between the drain pipe and the edges of the shower wall and shower floor.

If it is necessary to select a gap size that is sufficiently large, a strainer or screen can be placed at the discharge gap to prevent small objects such as rings or other jewelry from passing through the gap. Alternatively, the strainer can be disposed at the mouth of the drain guide.

Another advantage is that the drain can be disposed near the wall, instead of near the center of the floor as is typically the case. A drain near the center of the floor requires additional guide pipes for connecting between the drain and drainage pipes disposed in the wall. The present invention can minimize or eliminate the need for the additional guide pipes.

BRIEF DESCRIPTION OF THE DRAWINGS

The preferred embodiments of this invention, illustrating all their features, will now be discussed in detail. These embodiments depict the novel and nonobvious shower bath and drain of this invention shown in the accompanying drawings, which are included for illustrative purposes only. These drawings include the following figures, with like numerals indicating like parts.

DETAILED DESCRIPTION OF THE INVENTION

Figure 1:
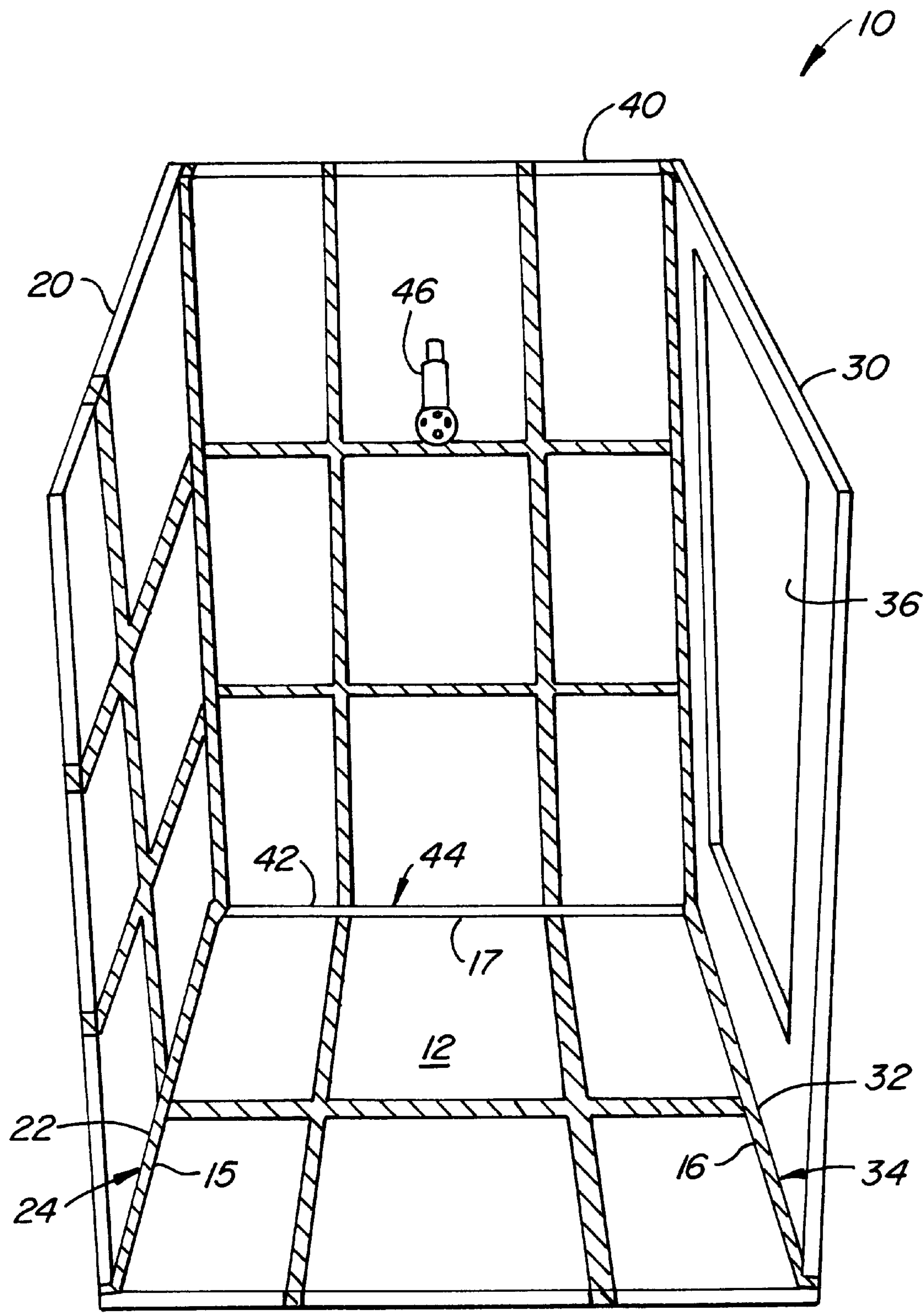
FIG. 1 is a perspective view of a shower bath in accordance with an embodiment of the present invention.
Figure 2:
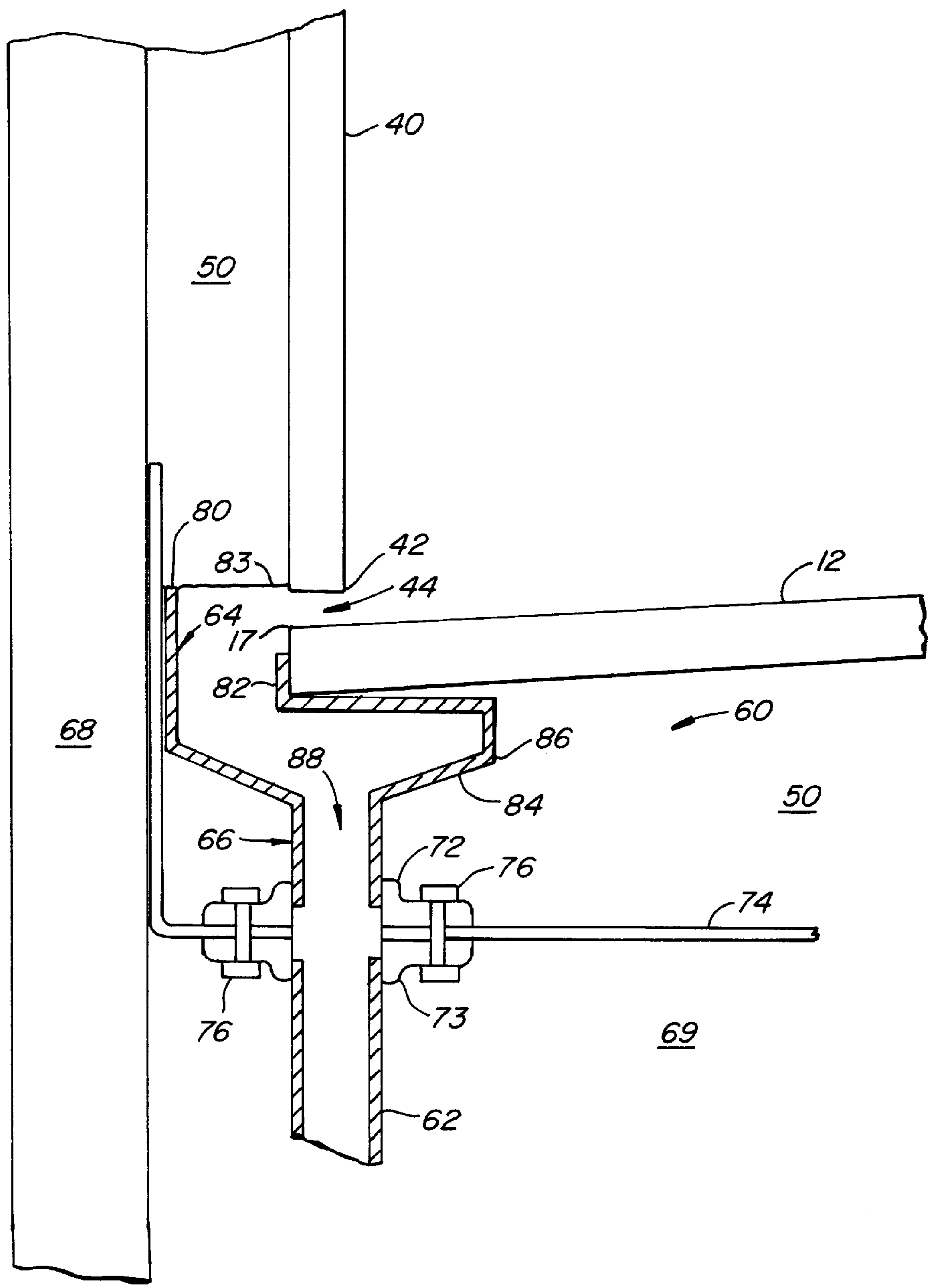
FIG. 2 is a cross-sectional view of the shower bath of FIG. 1 along A—A.

FIGS. 1 and 2 show a shower bath 10 having a shower floor 12 that is generally rectangular with four side edges 15, 16, 17, 18. The shower bath 10 has four wall portions that correspond to the four side edges, only three of which are shown. The first wall portion 20 extends upwardly from the first side edge 15 and includes a lower edge 22 that is spaced above the first side edge 15 to form a first gap 24. The first gap 24 is filled with grout. The second wall portion 30 extends upwardly from the second side edge 16 and includes a lower edge 32 that is spaced above the second side edge 16 to form a second gap 34. The second gap 34 is also filled with grout. The second wall portion 30 includes an entry 36 which may be fitted with a door (not shown). The third wall portion 40 extends upwardly from the third side edge 17 and includes a lower edge 42 that is spaced directly above the third side edge 17 to form a third gap which is a water discharge gap 44. The discharge gap 44 is bounded at two ends by the grout of the first gap 24 and second gap 34. The third wall portion 40 is connected between the first and second wall portions 20, 30. A shower head 46 protrudes from the third wall portion 40.

The wall portions 20, 30, 40 are substantially vertical relative to the shower floor 12, but may also be formed at an angle relative to the floor 12. The shower floor 12 and wall portions 20, 30, 40 are made of stones, such as natural stones such as granite and marble, or ceramic materials. The stones are set and secured to a mortar structure or bed 50, which is disposed below the shower floor 12 and behind the wall portions 20, 40. The setting of the stones creates gaps along natural lines of joint between neighboring stones that are filled with grout. The first and second gaps 24, 34 are examples of such gaps along natural lines of joint that are filled with grout. The discharge gap 44 is an open gap formed at a natural line of joint between the lower edge 42 of the third wall portion 40 and the third side edge 17 of the floor 12. The creation of the discharge gap 44 requires no additional step in the construction of the shower bath 10. Instead, the natural formation of the discharge gap 44 eliminates the need to fill the gap with grout. The formation of the discharge gap 44 at the natural line of joint is a way to make stone shower baths more attractive and easier to build. It is not applicable in shower baths molded of plastic because molded shower baths do not have natural lines of joint. Molded shower baths also do not have the same appearance problems found in stone shower baths.

As best seen in FIG. 2, the shower floor 12 is advantageously slightly inclined in a direction downwardly toward the discharge gap 44 and generally perpendicular to the third side edge 17. The incline facilitates water flow through the discharge gap 44 and avoids accumulating water on the floor 12. With this configuration, the shower floor 12 can be substantially planar with no need for cutting an opening for a drain cover or diagonal lines to create slopes. The stones of the shower floor 12 can be arranged in any manner desirable to create a decorative pattern.

The discharge gap 44 in the embodiment shown extends across the entire length of the third side edge 17 of the shower floor 12, as shown in FIG. 1. The gap 44 is substantially straight and uniform in height. The uniform height is advantageous for a straight gap because the direction of the incline of the shower floor 12 tends to distribute the water evenly across the length of the gap 44. In other embodiments (not shown), the third side edge may be curved so that the discharge gap is also curved or the incline of the shower floor may be skewed so that the discharge gap is inclined as well. Those configurations do not tend to distribute the water evenly across the length of the gap so that a nonuniform gap height may be more efficient in discharging the water from the shower floor.

The gap size or height of the discharge gap 44 depends largely on its length because the area of the gap 44 formed by the length and height defines the restriction of water flow therethrough. The longer the length, the smaller the gap height can be selected. In a typical shower bath 10 having the rectangular configuration shown in FIGS. 1 and 2, the length of the discharge gap 44 is about 4 feet. The discharge gap 44 is desirably so small that it is not visible by a person in a standing position. The gap height will generally be smaller than about 0.5 inch, more desirably about 0.25 inch. In that case, the area of water flow through the gap 44 is about 12 square inch, which is approximately equivalent to the area of a circular drain opening of about 4 inch in diameter. A gap size of about 0.25 inch is sufficiently small to prevent small objects such as rings or other jewelry from passing through the discharge gap 44. If it is necessary to select a gap size of larger than about 0.25 inch, a screen or strainer plate (not shown) may be placed at the discharge gap 44 and secured between the lower edge 42 of the third wall portion 40 and the third side edge 17 of the floor 12.

FIG. 2 also shows a drain guide 60 which guides the water from the discharge gap 44 to a drain pipe 62. The drain guide 60 includes an upper channel portion 64 coupled to the gap 44 and a lower conduit or spout 66 coupled to the drain pipe 62. The drain pipe 62 is commonly disposed adjacent the structural wall 68 of a building. Because the third wall portion 40 of the shower bath 10 is typically set against the structural wall 64, the drain pipe 62 will be close to the discharge gap 44. As shown in FIG. 2, the drain pipe 62 is disposed generally directly below the discharge gap 44, and extends toward the structural floor 69 of the building. The lower conduit 66 of the drain guide 60 is coupled to the drain pipe 62 by standard drain collars 72, 73 disposed at the structural floor 69. A waterproof sheet 74 is sandwiched between the drain collars 72, 73 which are connected together by screws 76. The waterproof sheet 74 covers the structural floor 69 and separates it from the mortar bed 50. The upper drain collar 72 receives the lower conduit 66 of the drain guide 60 and the lower drain collar 73 positions the drain pipe 62 directly below the lower conduit 66. The drain of the shower bath 10 is located below the shower floor 12 and invisible. Moreover, the open drain currently in use is commonly disposed near the center of the shower floor 12 and requires relatively long guide pipes for connecting between the drain opening near the center to the drain pipe near the structural wall. The present invention eliminates the need for using long guide pipes.

Figure 3:
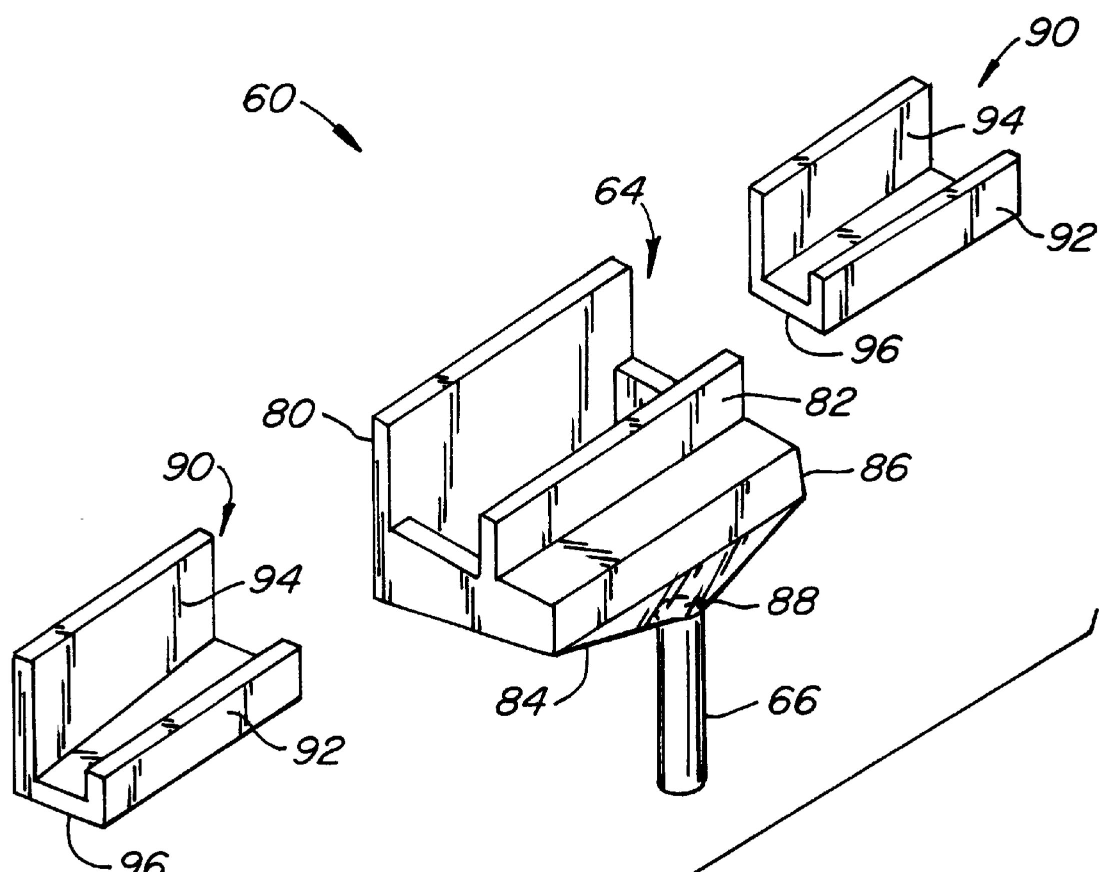
FIG. 3 is an exploded perspective view of a drain guide for the shower bath of the present invention.

FIG. 3 more clearly shows the drain guide 60 having the upper channel portion 64 and lower conduit 66. The upper channel portion 64 includes a rear channel wall 80 generally horizontally spaced from a front channel wall 82. As best seen in FIG. 2, the edge of the rear channel wall 80 cooperates with a lower edge 83 of the mortar structure 50 which typically is generally aligned with the lower edge 42 of the third wall portion 40. It is also possible to bend the rear channel wall 80 near the top so that the edge cooperates with the lower edge 42. The edge of the front channel wall 82 typically cooperates with the third side edge 17 of the floor 12. Therefore, the rear channel wall 80 may be substantially identical in shape to the lower edge 42 and the front channel wall 82 may be substantially identical in shape to the third side edge 17. FIG. 3 shows straight rear and front channel walls 80, 82 for cooperating with the straight gap 44. A channel bottom portion 84 connects the rear channel wall 80 with the front channel wall 82, and desirably includes a protruded portion or funnel 86 for collecting the water to avoid backing up the water flow. The lower conduit 66 is connected to the channel bottom portion 84 at a drain opening 88. The lower conduit 66 has a generally circular shape. The drain guide 60 is made of a water-impermeable material such as plumbing plastic.

The embodiment of the drain guide 60 in FIG. 3 has substantially parallel rear and front channel walls 80, 82 and a channel bottom portion 84 having a funnel shape which is inclined downwardly to the drain opening 88. Other shapes are possible. For instance, the rear and front channel walls 80, 82 may be inclined and nonparallel. The rear and front channel walls 80, 82 may be curved if the discharge gap 44 is curved. The channel bottom portion 84 may be substantially flat and horizontally disposed. The inclined channel bottom portion 84 is desirable for avoiding accumulation of standing water.

Figure 4:
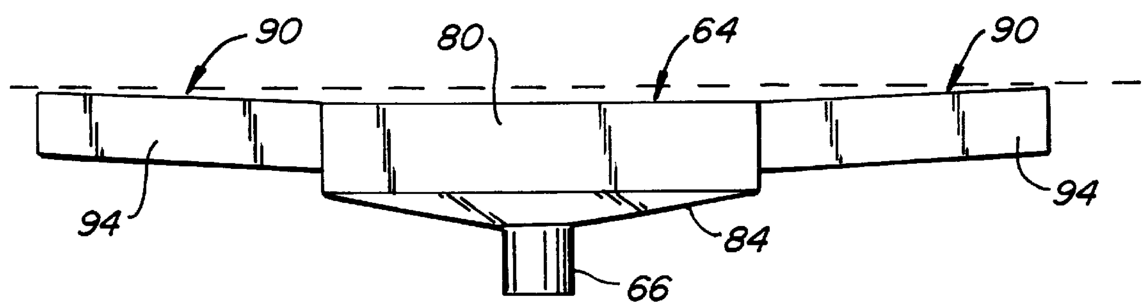
FIG. 4 is a rear elevational view of the drain guide of FIG. 3.

In general, the upper channel portion 60 has a length which extends across the entire discharge gap 44. Because of the length of the gap 44 may vary between different shower baths, the upper channel portion 60 may need to be adjusted. Shortening the upper channel portion 60 can be readily achieved by cutting off the excess portions. Lengthening the upper channel portion 60 is also possible using channel extensions or wings 90 as illustrated in FIG. 3. The channel wing 90 is generally a U-shaped member which is connected to the end of the upper channel portion 60 to extend its length. The channel wing 90 has a rear wall 92 with an edge that cooperates the lower edge 83 of the mortar structure 50 behind the third wall portion 40 and a front wall 94 with an edge that cooperates the third side edge 17 of the floor 12. The channel wing 90 has a bottom 96 that is generally flat. The channel wing 90 and upper channel portion 60 can simply be laid end-to-end on the mortar bed 50. In the embodiment shown in FIGS. 3 and 4, the channel wings 90 are stacked over the ends of the upper channel portion 60. The bottoms 96 of the channel wings 90 are desirably angled toward the upper channel portion 60 as shown in FIG. 4 to facilitate water flow to the drain opening 88. Additional channel wings 90 may be used if further length extensions of the upper channel portion 60 are needed.

The drain guide 60 may include deformable rear and front channel walls 80, 82 that can be bent and shaped as desired. The advantage of having deformable walls is that the drain guide 60 can be shaped to fit structures with different relative spacings between the drain pipe 62, structural wall 68, third wall portion 40, and shower floor 12. For instance, the drain pipe 62 may be shifted so that its spacings relative to the remaining components are different. To ensure that the drain guide 60 properly captures the water flowing through the gap 44, the rear and front channel walls 80, 82 are deformed to match their edges respectively to the lower edge 83 of the mortar structure 50 and the third side edge 17 of the floor 12. In this way, the drain guide 60 is adjustable and versatile.

The drain guide 60 can be installed easily on the mortar bed 50 with the lower conduit 66 connected to the upper drain collar 72. The upper channel portion 60 is positioned where the discharge gap 44 will be before the shower floor 12 and shower wall portions 20, 30, 40 are constructed. In addition, if a strainer is needed, it can be pre-installed or pre-formed in the upper channel portion 60 between the rear and front channel walls 80, 82.

The above-described arrangements of apparatus and methods are merely illustrative of applications of the principles of this invention and many other embodiments and modifications may be made without departing from the spirit and scope of the invention as defined in the claims.

What is claimed is:

1. A shower bath comprising:

a floor having a plurality of edge portions which include a discharge edge portion and filled edge portions, the floor being substantially planar and inclined downwardly in a direction generally toward the discharge edge portion;

a drain disposed below the floor adjacent the discharge edge portion; and a plurality of wall portions disposed above the floor and including a discharge wall portion and filled wall portions, the discharge wall portion having a lower edge which is adjacent to and spaced directly above the discharge edge portion to form a discharge gap along a line of joint, the filled wall portions each having a lower edge adjacent to and spaced above one of the plurality of filled edge portions of the floor along a line of joint to form a filled gap which is filled with grout, the discharge gap being bounded at two ends by the grout of adjacent filled gaps, so that the water falling on the floor can exit through the discharge gap to the drain below the floor.

2. The shower bath of claim 1, wherein the lower edge of the discharge wall portion is substantially identical in shape to the discharge edge portion of the floor.

3. The shower bath of claim 1, wherein the discharge gap is substantially uniform in height.

4. The shower bath of claim 1, wherein the lower edge of the discharge wall portion and the discharge edge portion of the floor forming the discharge gap are substantially straight.

5. The shower bath of claim 1, wherein the discharge gap has a height of under about 0.5 inch.

6. The shower bath of claim 5, wherein the discharge gap has a height of about 0.25 inch.

7. The shower bath of claim 1, wherein the floor comprises a pattern of stone segments laid on mortar having adjoining gaps therebetween that are filled with grout.

8. The shower bath of claim 1, wherein the drain includes an upper channel portion disposed adjacent the discharge gap for collecting the water exiting through the discharge gap, the upper channel portion having a drain opening leading to a lower spout for discharging the water to a drain pipe.

9. The shower bath of claim 8, wherein the upper channel portion extends from one end of the discharge gap to the other end of the discharge gap.

10. The shower bath of claim 8, wherein the upper channel portion includes a rear channel wall cooperating with the lower edge of the discharge wall portion, a front channel wall cooperating with the discharge edge portion of the floor, and a channel bottom connecting the rear channel wall with the front channel wall, the channel bottom having the drain opening.

11. The shower bath of claim 10, wherein the channel bottom is inclined downwardly toward the drain opening.

12. The shower bath of claim 10, wherein the upper channel portion extends along a portion of the discharge gap, and the drain further includes at least one channel wing coupled to an end of the upper channel portion and extending along a remaining portion of the discharge gap.

13. The shower bath of claim 12, wherein the drain includes two channel wings each coupled to one of two ends of the upper channel portion and extending from the end of the upper channel portion to one of the two ends of the discharge gap.

* * * * *